US011213033B2

(12) United States Patent
Goupil et al.

(10) Patent No.: US 11,213,033 B2
(45) Date of Patent: Jan. 4, 2022

(54) METHOD FOR REUSING LEAVES FROM ARBORESCENT WOODY PLANTS, FOR THE PHYTOPHARMACEUTICAL INDUSTRY

(71) Applicants: CENTRE NATIONAL DE LA RECHERCHE SCIENTIFIQUE—CNRS, Paris (FR); UNIVERSITE BLAISE PASCAL CLERMONT II, Clermont Ferrand (FR)

(72) Inventors: Pascale Goupil, Perignat-les-Sarlieve (FR); Claire Richard, Beaumont (FR); Alexandra Ter Halle, Lezoux (FR)

(73) Assignee: Agro Innovation International

( * ) Notice: Subject to any disclaimer, the term of this patent is extended or adjusted under 35 U.S.C. 154(b) by 0 days.

(21) Appl. No.: 15/124,577

(22) PCT Filed: Mar. 6, 2015

(86) PCT No.: PCT/FR2015/050561
§ 371 (c)(1),
(2) Date: Sep. 8, 2016

(87) PCT Pub. No.: WO2015/136195
PCT Pub. Date: Sep. 17, 2015

(65) Prior Publication Data
US 2017/0013845 A1    Jan. 19, 2017

(30) Foreign Application Priority Data
Mar. 13, 2014 (FR) ...................... 14 52112

(51) Int. Cl.
| A01N 65/08 | (2009.01) |
| A01N 41/10 | (2006.01) |
| A01N 65/34 | (2009.01) |
| A01N 65/00 | (2009.01) |
| B01D 11/02 | (2006.01) |
| C11B 5/00  | (2006.01) |

(52) U.S. Cl.
CPC ............ *A01N 65/08* (2013.01); *A01N 41/10* (2013.01); *A01N 65/00* (2013.01); *A01N 65/34* (2013.01); *B01D 11/0288* (2013.01); *C11B 5/0035* (2013.01)

(58) Field of Classification Search
CPC . C05F 11/00; C05G 5/23; A47L 13/10; A47L 1/00; C11D 7/44
See application file for complete search history.

(56) References Cited

U.S. PATENT DOCUMENTS

| 4,285,719 A * | 8/1981 | Criss ................. C05F 3/04 71/13 |
| 4,308,047 A * | 12/1981 | Holland ............... A47L 1/00 71/23 |
| 4,698,222 A | 10/1987 | Grinda et al. |
| 2006/0073220 A1 | 4/2006 | Daugherty et al. |
| 2010/0016161 A1 * | 1/2010 | Richard ............... A01N 65/00 504/140 |
| 2014/0271777 A1 * | 9/2014 | Quave ............... A01N 43/90 424/423 |

FOREIGN PATENT DOCUMENTS

| FR | 2 526 632 | 11/1983 |
| WO | 2003/079794 | 10/2003 |

OTHER PUBLICATIONS

Popović et al. (The Scientific World Journal, 2013, 1-8; accessed online Sep. 23, 2019 http://downloads.hindawi.com/journals/tswj/2013/134656.pdf) (Year: 2013).*
Peng et al. (J. of Chemical Ecology, 1991, 17(5), 887-896) (Year: 1991).*
The International Search Report for PCT/FR2015/050561 dated May 13, 2015, pp. 1-3.
Nicolsa Aveline "Reduction des intrants : quelles altrnatives?, Produits alternatifs et SDN pour protegerla vigne" Les Entretiens Viti•Vinicoles Rhone Mediterranee (2009), pp. 3-8 XP055149510.
The Written Opinion for PCT/FR2015/050561 dated May 13, 2015, pp. 1-5.
De Wit, P.J.G.M., How plants recognize pathogens and defend themselves, Cellular and Molecular Life Sciences, vol. 64, 2007.
Ciesla, William M., Non-Wood Forest Products from Temperature Broad-leaved Trees, Food and Agriculture Organization of the United Nations, 2002.
The New Encyclopaedia Britannica, vol. 8, Macropaedia, 1990, p. 845.

* cited by examiner

*Primary Examiner* — Aaron J Kosar
(74) *Attorney, Agent, or Firm* — McDonnell Boehnen Hulbert & Berghoff LLP (57) ABSTRACT

The invention relates to a method for reusing deciduous leaves of arborescent woody plants, which allows obtaining an extract used for a phytosanitary application, in particular the elicitation of a plant, preventive or curative treatment of a plant against a pathogenic agent, or improvement of the performance of a phytosanitary product.

8 Claims, 4 Drawing Sheets

METHOD FOR REUSING LEAVES FROM ARBORESCENT WOODY PLANTS, FOR THE PHYTOPHARMACEUTICAL INDUSTRY

This application is a U.S. national phase of International Application No. PCT/FR2015/050561, filed Mar. 6, 2015, which claims priority from French Patent application no. FR 1452112, filed Mar. 13, 2014, the disclosure of each of which is hereby incorporated by reference in its entirety.

FIELD OF THE INVENTION

The present invention relates to a method for reusing deciduous leaves of arborescent woody plants, for the phytopharmaceutical industry.

CONTEXT OF THE INVENTION

Nearly 10% of the surface of the planet is covered with arborescent woody plants. An arborescent woody plant produces nearly 300 kg of leaves per year on the average. This biomass is both abundant and easily accessible, but is little used. The deciduous leaves of arborescent woody plants are rarely collected after abscission and are left to rot. Those that are collected are composted, incinerated, or buried. In all cases, this abundant biomass is the source of a significant release of greenhouse gases such as carbon dioxide and methane.

It would therefore be useful to develop a method for reusing the deciduous leaves of arborescent woody plants that allows recycling them and reducing their environmental impact.

Surprisingly, the Applicant has found a way to recycle this abundant but currently unused biomass and to use it naturally to improve the health of other plants, thus establishing a virtuous circle. It has been found that an extract from deciduous leaves of arborescent woody plants has properties enabling it to be used, alone or mixed with a phytosanitary product, for a phytosanitary application.

For the purposes of the present invention, a phytosanitary product is defined as a product intended to protect plants against all harmful organisms or to prevent the action of such organisms. For example, pesticides, herbicides, fungicides, insecticides, and molluscicides are phytosanitary products within the meaning of the present invention.

A first aspect of the invention therefore relates to a method for reusing the deciduous leaves of arborescent woody plants, comprising the steps of:
a) collecting deciduous leaves of arborescent woody plants,
b) extracting from said leaves by means of a solvent, and
c) using said extract for a phytosanitary application.

According to a second aspect, the invention also relates to a use of an extract from deciduous leaves of arborescent woody plants, for a phytosanitary application.

According to a third aspect, the invention also relates to a phytosanitary method which comprises the application of a composition comprising an extract from deciduous leaves of arborescent woody plants, onto a plant.

BRIEF DESCRIPTION OF THE FIGURES

In FIG. 1, EAU refers to water, and AS means salicylic acid (SA).

In FIG. 2, EAU refers to water, AS means salicylic acid (SA), zones fluorescentes means fluorescent regions, and zones chlorotiques means chlorotic regions.

In FIG. 3, zones chlorotiques means chlorotic regions.

In FIG. 6, zones chlorotiques means chlorotic regions.

DETAILED DESCRIPTION OF THE INVENTION

According to a first aspect, the invention relates to a method for reusing deciduous leaves of arborescent woody plants, comprising the steps of:
a) collecting deciduous leaves of arborescent woody plants,
b) extracting from said leaves by means of a solvent, and
c) using said extract for a phytosanitary application.

An arborescent woody plant is a perennial plant that produces hard secondary tissues called xylem II or WOOD and which takes the form of a tree. The wide geographical distribution of deciduous leaves of arborescent woody plants makes this an abundant raw material, readily available and easily accessible, especially in the autumn.

According to one embodiment, the arborescent woody plant is selected from the group consisting of acacia, birch, hornbeam, chestnut, oak, maple, ash, beech, chestnut, platanus, prunus, willow, *sophora*, poplar, and a mixture thereof, and more preferably selected from the group consisting of maple, prunus, platanus, oak, and mixtures thereof.

Advantageously, the method of the invention allows recycling and reusing the abundant biomass represented by the deciduous leaves of arborescent woody plants. The method of the invention also reduces the production of greenhouse gases by this abundant and unused biomass. Advantageously, the method according to the invention therefore limits the environmental impact of this abundant but unused biomass.

The method according to the invention comprises, prior to the extraction step, a step of collecting deciduous leaves of arborescent woody plants. This collection step may occur at different places and times than the other steps of the method. The collection step may be done before or after abscission.

After collection, deciduous leaves of arborescent woody plants may undergo physical preprocessing, for example cutting, shredding, and/or powdering. Advantageously, this physical preprocessing increases the yield from extraction step b) of the method for reuse according to the invention. They are not composted or fermented.

According to one embodiment, the deciduous leaves of arborescent woody plants do not undergo decoction, maceration, or infusion.

According to one embodiment, the extraction step b) is carried out using an aqueous, alcoholic, or hydroalcoholic solvent.

One example of an aqueous solvent is bisulfite in water, where the bisulfite content may be between 0.5 g/l and 2 g/l, preferably between 0.75 g/l and 1.5 g/l, more preferably about 1 g/l. Bisulfite improves solubilization of the extract from deciduous leaves of arborescent woody plants and prevents its oxidation.

In one particular embodiment, the solvent is a hydroalcoholic solvent comprising water and ethanol. The solvent comprises more than 25% ethanol (v/v), preferably more than 50% ethanol (v/v), more preferably more than 75% ethanol (v/v).

The solvent may also be slightly acidified by the addition of an acid. A slightly acidified solvent advantageously stabilizes the extract from deciduous leaves of arborescent woody plants. The acid content in the solvent is then less than 5% acid (v/v), preferably less than 2.5% acid (v/v), more preferably less than 1% acid (v/v). The acid is selected from the group consisting of hydrochloric acid, nitric acid, sulfuric acid, acetic acid, and a mixture thereof.

According to a preferred embodiment, the hydroalcoholic solvent comprises 80% ethanol (v/v) and 0.5% 0.1N hydrochloric acid (v/v).

According to one embodiment, the extraction step b) is carried out at ambient temperature, in other words between about 18° C. and about 25° C.

According to one embodiment, extraction step b) is carried out only once.

According to one embodiment, extraction step b) is carried out multiple times, recycling the solvent and/or the deciduous leaves of arborescent woody plants in order to improve the yield of extraction step b).

The extract from deciduous leaves of arborescent woody plants obtained in step a) has elicitor activity. It thus stimulates the natural defenses of a plant to which it has been previously applied. The extract also has biocidal activity, enabling it to treat a plant preventively or curatively for a pathogen, it having been applied in advance to said plant. Finally, the extract can be used with a phytosanitary product to improve performance. The extract thus reduces the amount of phytosanitary products used and reduces their accumulation in plants and thus the hazard they may pose to the environment, humans, and animals. In particular, the extract helps provide photoprotection or photostabilization for a phytosanitary product, particularly a pesticide.

Given the properties of the extract from deciduous leaves of arborescent woody plants described above, the phytosanitary application consists of elicitation of a plant, preventive or curative treatment of a plant against a pathogen, or improvement of the performance of a phytosanitary product.

In particular, the improvement of the performance of a phytosanitary product consists of providing photoprotection or photostabilization of a phytosanitary product, particularly a pesticide.

The extract from deciduous leaves of arborescent woody plants comprises compounds that are easy to extract and are water-soluble, and are therefore easy to use (easy to dilute in a composition, for example). The compounds are natural, as they are synthesized by an arborescent woody plant, allowing the use of the extract in organic farming. These compounds are polyphenols and anthocyanins.

According to one embodiment, the extract from deciduous leaves of arborescent woody plants comprises less than 45% polyphenols by weight relative to the dry weight of the extract. Preferably, the extract comprises between 5% and 40% polyphenols by weight relative to the dry weight of the extract.

The extract from deciduous leaves of arborescent woody plants may also comprise less than 2% anthocyanins by weight relative to the dry weight of the extract. Preferably, the extract comprises less than 1.1% anthocyanins by weight relative to the dry weight of the extract.

The method for reuse according to the invention is quite suitable for a phytosanitary application to plants selected from the group consisting of agronomically useful plants, herbs, and ornamentals. Agronomically useful plants and herbs are selected from the group consisting of angiosperms including Alliaceae, Apiaceae, Asteraceae, Brassicaceae, Chenopodiaceae, Convolvulaceae, Cucurbitaceae, Fabaceae, Lamiaceae, Liliaceae, Buckwheat, Rosaceae, Solanaceae, Poaceae, and Vitaceae.

A single application of the extract prior to pathogen attack may be sufficient to achieve the desired phytosanitary application. However, the manner of application of course depends on the species of plant to be treated and its stage of development; therefore it may sometimes be necessary to apply the extract at least one more time a few days or weeks after the first application.

According to a second aspect, the invention concerns the use of an extract from deciduous leaves of arborescent woody plants, for a phytosanitary application.

The extract from deciduous leaves of arborescent woody plants is advantageously obtained according to the method described above.

According to one embodiment of the use according to the invention, the phytosanitary application consists of elicitation of a plant, preventive or curative treatment of a plant against a pathogen, or improvement of the performance of a phytosanitary product.

In particular, the improvement of the performance of a phytosanitary product consists of photoprotection or photostabilization of a phytosanitary product, particularly a pesticide.

The use according to the invention may be implemented on agronomically useful plants and ornamentals. Such plants are those mentioned above in relation to the method for reuse.

According to a third aspect, the invention also relates to a method for the phytosanitary treatment of a plant, which comprises applying a composition comprising an extract from deciduous leaves of arborescent woody plants, onto said plant.

The composition used in the phytosanitary treatment method according to the invention comprises an extract from deciduous leaves of arborescent woody plants as the active ingredient. The extract from deciduous leaves of arborescent woody plants is advantageously obtained according to the method described above.

The composition used in the phytosanitary treatment method according to the invention may be in liquid or powder form.

When the composition is in powder form, it is devoid of any other active agent.

Before it is added to the composition, the extract from deciduous leaves of arborescent woody plants may be in liquid or powder form.

When the extract from deciduous leaves of arborescent woody plants is in liquid form, it may be aqueous, alcoholic, or hydroalcoholic; preferably the extract is hydroalcoholic.

When the extract from deciduous leaves of arborescent woody plants is in powder form, it is obtained after a solvent separation step described above in connection with step a) of the method for reuse. Advantageously, the separation does not degrade the compounds present in the extract from deciduous leaves of arborescent woody plants and does not alter the concentration. This separation is achieved by processing selected from the group consisting of drying, freeze-drying, atomization, and evaporation, preferably freeze-drying.

The composition may further comprise a phytosanitary product, an adjuvant, a preservative, or any other additive intended to improve leaf penetration.

The phytosanitary product is selected from the group consisting of a pesticide, a herbicide, a fungicide, an insecticide, a molluscicide, and a mixture thereof.

According to one embodiment of the method of the invention, the phytosanitary treatment consists of elicitation of a plant, preventive or curative treatment of a plant against a pathogen, or improvement of the performance of a phytosanitary product.

The phytosanitary product for which the performance is improved by the extract from deciduous leaves of arborescent woody plants is either added to the composition or is previously applied to a plant targeted by the phytosanitary method of the invention.

In particular, the improvement of the performance of a phytosanitary product consists of providing photoprotection or photostabilization of a phytosanitary product, particularly a pesticide.

According to one embodiment of the treatment method according to the invention, the composition is in liquid form and is applied by infiltration or by foliar spraying.

The concentration of extract from deciduous leaves of arborescent woody plants in the composition used in the phytosanitary method according to the invention is between 0.001 and 5%, preferably between 0.005 and 2.5%, more preferably between 0.01% and 1.25%, relative to the dry weight of the extract.

For application by infiltration, the concentration of extract from deciduous leaves of arborescent woody plants in a composition used in the phytosanitary method according to the invention is between 0.1 and 5%, preferably between 0.25 and 2.5%, even more preferably between 0.75% and 1.25%, relative to the dry weight of the extract. This composition is particularly useful for elicitation of a plant and for preventive or curative treatment of a plant against a pathogen.

For application by foliar spraying, the concentration of extract from deciduous leaves of arborescent woody plants in a composition used in the phytosanitary method according to the invention is between 0.001 and 2%, preferably between 0.005 and 1%, more preferably between 0.01% and 0.05%, relative to the dry weight of the extract, for application by foliar spraying. This composition is particularly useful for improvement of the performance of a phytosanitary product added to the composition or applied to a plant.

A single application of the composition before the pathogen attack may be sufficient. However, it may sometimes be necessary to do at least one new application a few days or weeks after the first.

The composition is applied in the amount of 0.1 kg/ha to 2 kg/ha, preferably 0.3 kg/ha to 1.5 kg/ha, of plants to be treated.

The application amounts and the manner of application are of course dependent on the species of plant being treated and its stage of development.

The phytosanitary treatment method according to the invention can be implemented on agronomically useful plants, herbs, and ornamentals. Such plants are those mentioned above in relation to the method for reuse.

Infiltration of an extract from deciduous leaves of arborescent woody plants in tobacco leaves and tomato leaves induces a local hypersensitive response accompanied by a systemic resistance response (SAR: Systemic Acquired Resistance), reflecting the elicitor effect of the extract, an effect characteristic of the induction of immunity against pathogens. The elicitor effect on tobacco leaves has been demonstrated at the molecular level by analyzing the expression of genes that are markers of SAR response, meaning genes encoding pathogenesis-related proteins (PR proteins) with PR1 (antimicrobial), PR2 (glucanase), PR3 (chitinase), and the PAL gene (phenylalanine ammonia lyase) encoding an enzyme involved in the synthesis of phenylpropanoids (phenolic compounds).

Infiltration of a composition comprising an extract from deciduous leaves of arborescent woody plants in tobacco leaves reduces infections caused by pathogens in those tobacco leaves.

The spraying of compositions comprising an extract from deciduous leaves of arborescent woody plants mixed with a pesticide reduces the kinetics of photodegradation of said pesticide by sunlight.

The invention will be described in more detail below using the following examples, which are provided for illustrative purposes only.

EXAMPLE 1

Synthesis and Characterization of Extracts From Deciduous Leaves of Arborescent Woody Plants Harvest Four arborescent woody plants were used as sources of deciduous leaves to obtain nine different extracts. The deciduous leaves were collected in August or in November, before or after abscission. Those collected in August do not show symptoms of leaf senescence, while those collected in November show these symptoms with autumn colors. Table 1 lists the leaf sources used.

TABLE 1

Sources of deciduous leaves used

| Extract no. | 1 | 2 | 3 | 4 | 5 | 6 | 7 | 8 | 9 |
|---|---|---|---|---|---|---|---|---|---|
| Arborescent woody plant | Red maple | Red maple | Prunus | Prunus | Platanus | Platanus | Red oak | Red oak | Mixture of senescent leaves |
| Collection period | August before abs. | Nov. before abs | August before abs. | Nov. before abs. | Nov. before abs. | Nov. after abs. | Nov. before abs. | Nov. after abs. | Nov. after abs. |

Obtaining an Extract

After harvesting, the leaves are powdered in liquid nitrogen. Extraction is performed using 5 g powdered leaves with 25 mL slightly acidified hydroalcoholic solvent (80% ethanol and 0.5% 0.1N HCl). After extraction, the homogenate is stored at −20° C. for 1 hour and the supernatant is collected by centrifugation at 500×g at 4° C. After two consecutive extractions, the extract is freeze-dried to remove the solvent.

Determination of Polyphenol and Anthocyanin Content in Extracts

The total polyphenol content is determined colorimetrically using Folin-Ciocalteu reagent, and the method described by Emmons and Peterson (Crop Sci, 2001, 41:1676-1681). The total anthocyanin content is determined by the differential pH method described by Muñoz-Espada et al. (J. Agr Food Chem, 2004, 52:6779-6786). The total content of polyphenols and anthocyanins is reported in Table 2.

TABLE 2

Polyphenol and anthocyanin content in extracts

| Extract no. | 1 | 2 | 3 | 4 | 5 | 6 | 7 | 8 | 9 |
|---|---|---|---|---|---|---|---|---|---|
| Total polyphenol content (% *) | 33 | 23.6 | 16.5 | 21.3 | 11.4 | 17.2 | 20.8 | 14.8 | 36 |
| Total anthocyanin content (%**) | 0.06 | 0.23 | 1.08 | 0.01 | 0.01 | 0.01 | 0.14 | 0 | 0.16 |

* weight of polyphenols relative to the dry weight of the extract.
**weight of anthocyanins relative to the dry weight of the extract.

The results indicate that the extracts have a total polyphenol content between 10 and 40% relative to the dry weight of the extract, and have a total anthocyanin content of less than 1.1% anthocyanins by weight relative to the dry weight of the extract.

EXAMPLE 2

Elicitor Effect on Tobacco Leaves

The experiments are performed on tobacco leaves taken from tobacco plants, at the 10-12 leaf stage (3 months), grown in greenhouses under controlled conditions (22±5° C. with a photoperiod of 16 hours of light).

The elicitor activity of nine extracts obtained in Example 1 is investigated. Nine compositions, comprising 1% extract relative to the dry weight of the extract, are obtained by dissolving the nine extracts in ultrapure water. Each composition is stored at 4° C. until use.

Macroscopic Symptoms

50 μl of the preceding compositions are infiltrated into tobacco leaves until the composition is spread over a surface area of 1 to 2 cm². A positive control is created using salicylic acid (2 mM) which is a known elicitor. A negative control is created using ultrapure water.

Results

Figure 1:
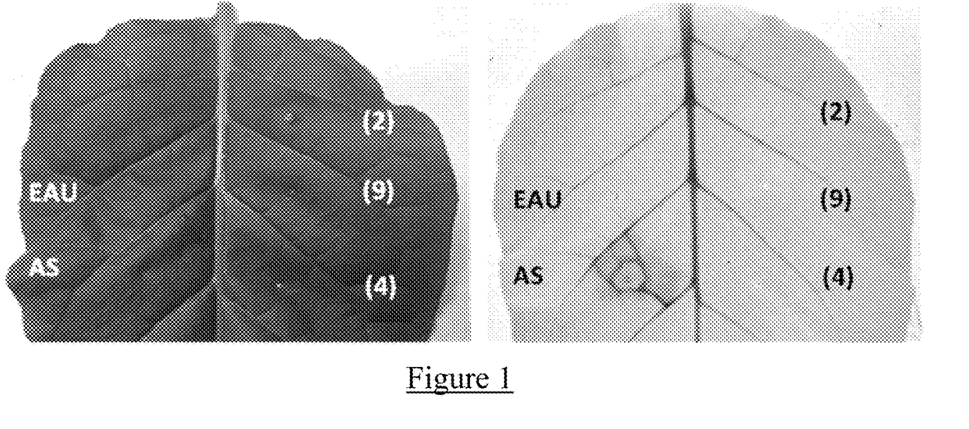
FIG. 1 shows two photographs of a tobacco leaf under white light (left) and under ultraviolet (wavelength 312 nm) (right), just after infiltration of compositions comprising various extracts prepared according to Example 1 (extracts 2, 4 and 9), ultrapure water (WATER), and salicylic acid (SA).
Figure 2:
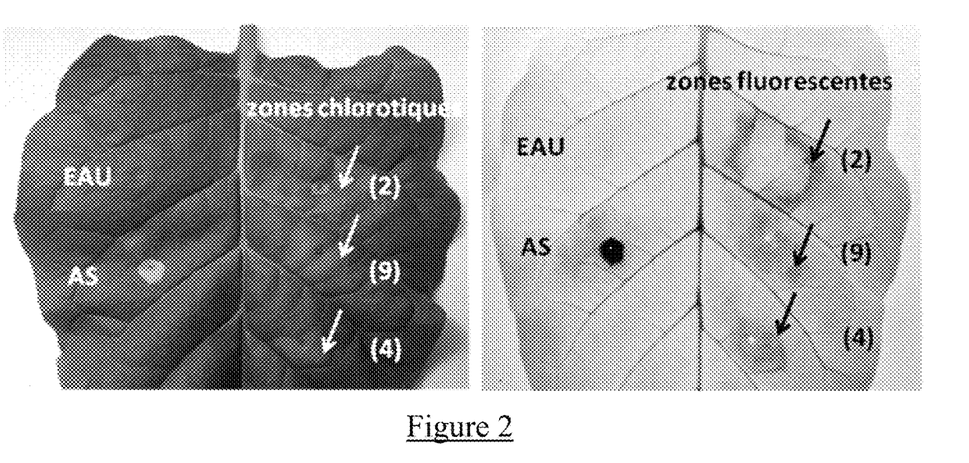
FIG. 2 shows two photographs of a tobacco leaf under white light (left) and under ultraviolet (wavelength 312 nm) (right), 4 days after infiltration of compositions comprising various extracts prepared according to Example 1 (extracts 2, 4 and 9), ultrapure water (WATER), and salicylic acid (SA).
Figure 3:
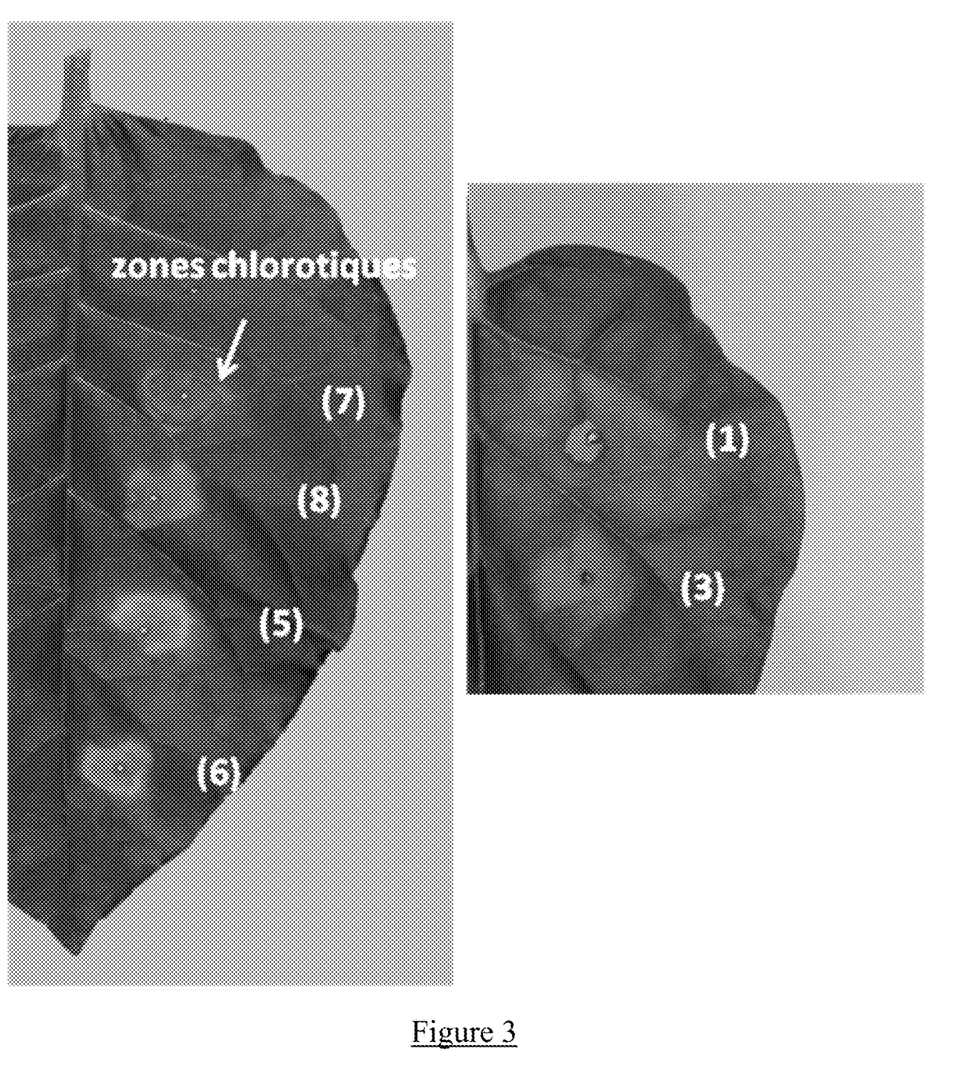
FIG. 3 shows two photographs of a tobacco leaf under white light, 4 days after infiltration of compositions comprising various extracts prepared according to Example 1 (Extracts 1, 3, 5, 6, 7 and 8).

One can see in the photographs of FIGS. 1, 2, and 3 that infiltration induces chlorosis (lighter area with no chlorophyll) in the infiltrated tissue, with the appearance of necrosis (dry brown area). It also induces a local accumulation of fluorescent compounds suggesting an accumulation of antimicrobial phenolic compounds, characteristic of the LAR ("Local Acquired Resistance") which occurs in plant defense responses.

Expression of Genes Associated With Plant Defense Responses

The elicitor activity of the extracts is demonstrated at the molecular level by analyzing the expression of genes related to plant defense responses PAL, PR1, PR2, and PR3. The molecular analysis consists of extracting total RNA from tobacco leaves infiltrated for four days, using the Tri-reagent extraction kit (Euromedex) and following the manufacturer's instructions. Reverse transcriptase is performed on 1 μg of the total RNA using the (RT) Euroscript (Eurogentec) and following the manufacturer's instructions.

RT-PCR fragments specific to PAL, PR1, PR2, and PR3 are quantified using the iQv3 software (BIO-RAD). The abundance of PAL, PR1, PR2, and PR3 transcripts is normalized (relative quantification) to those of a constitutive gene, encoding actin or elongation factor alpha.

Results

Figure 4:
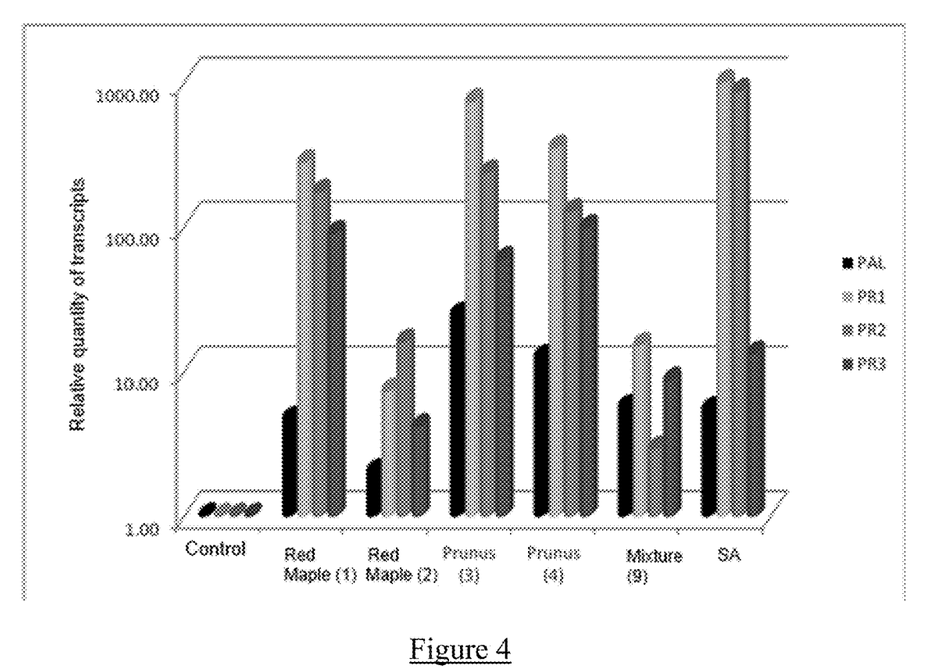
FIG. 4 is a graph showing the accumulation of transcripts encoding the genes related to plant defense responses (PAL, PR1, PR2, and PR3), 4 days after infiltration of compositions comprising various extracts prepared according to Example 1 (extracts 1, 2, 3, 4 and 9), salicylic acid (SA), and ultrapure water (Control).

FIG. 4 shows that accumulation of the genes is greater in leaves infiltrated with compositions comprising extracts 1, 2, 3, 4, and 9 than with ultrapure water. All compositions tested induce a significant accumulation of transcripts encoding the defense genes. The accumulation of defense genes in leaves infiltrated with the composition comprising extract 3 is of the same order of magnitude as in leaves infiltrated with salicylic acid, a known elicitor.

These data demonstrate the elicitor effect of extracts that induce accumulation of genes associated with plant defense responses.

EXAMPLE 3

Impact of the Solvent on the Elicitor Effect in Tobacco Leaves: Macroscopic Symptoms The tested extracts are obtained using leaves from red maples, collected in November before abscission.

The extraction method is identical to that of Example 1 but the solvent used is either water with bisulfite or 30% ethanol.

The test performed to analyze the macroscopic symptoms is identical to that of Example 2.

Figure 5:
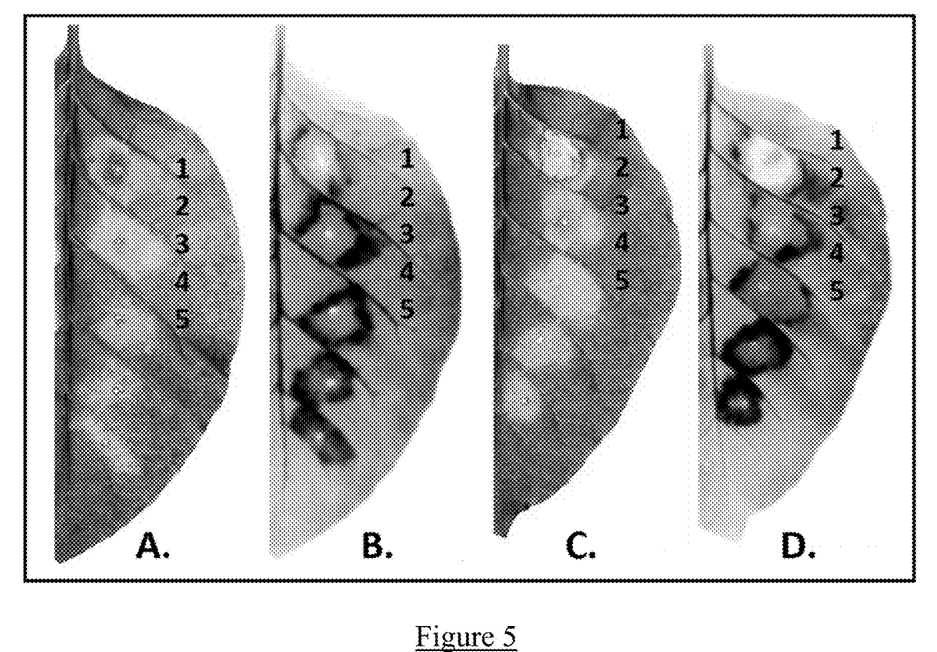
FIG. 5 shows four photographs of tobacco leaves under white light (A and C) and Ultraviolet light (wavelength 312 nm) (B and D)), 4 days after infiltration of compositions comprising extracts obtained with bisulfate in water (A and B) or 30% ethanol (C and D) and having different polyphenol content.

Infiltration of red maple extracts resulting from extraction with bisulfite in water (photographs A and B in FIG. 5) or 30% ethanol (photographs C and D in FIG. 5) comprising 0.19% polyphenols (1), diluted two times (2), four times (3), eight times (4), and sixteen times (5), leads to chlorosis formation as can be seen in photographs A and C of FIG. 5.

Photographs B and D of FIG. 5 show that chlorosis formation is accompanied by the formation of fluorescent compounds. These phenomena indicate the establishment of defense reactions.

Both solvents used for polyphenol extraction are therefore suitable for extracting active biomolecules triggering the HR (hypersensitive) response.

EXAMPLE 4

Elicitor Effect in Tomato Leaves

The experiments are performed on tomato leaves from tomato plants six weeks old, at the 5-6 leaf stage, grown in greenhouses under controlled conditions (22±5° C. with a photoperiod of 16 hours of light).

The elicitor activity of the extracts obtained in Example 1 is investigated. Three compositions comprising 0.25% extract relative to the dry weight of the extract are obtained by dissolving the extracts in ultrapure water. Each composition is stored at 4° C. until use.

Macroscopic Symptoms

50 µl of compositions comprising extracts 1, 8, and 9 is infiltrated into the tomato leaves until the composition has spread over a surface area of 1 to 2 cm². A positive control is created using salicylic acid (2 mM) which is a known elicitor. A negative control is created using ultrapure water.

Results

Figure 6:
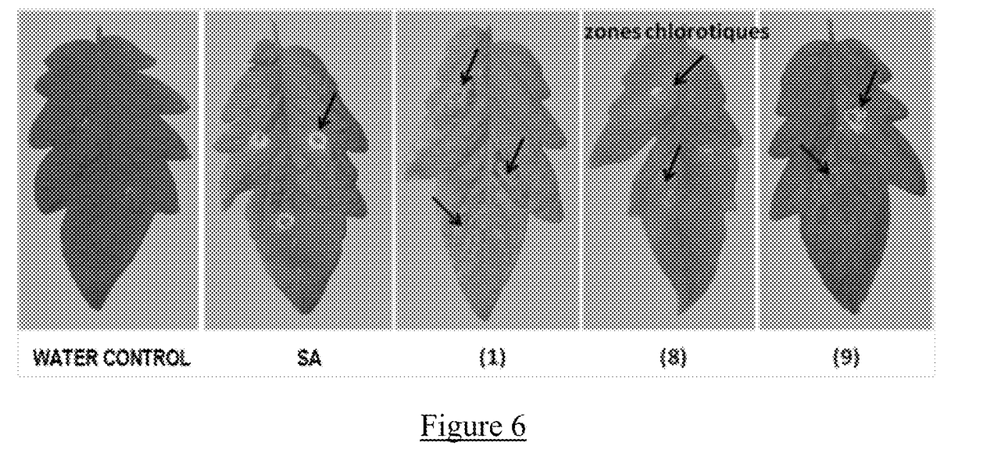
FIG. 6 shows five photographs of tomato leaves under white light, 4 days after infiltration of compositions comprising different extracts (extracts 1, 8 and 9), ultrapure water (WATER CONTROL) and salicylic acid (SA).

We can see in the photographs of FIG. 6 that the infiltration induces chlorosis (light area without any chlorophyll) in the infiltrated tissue, with the appearance of necrosis (brown dry area), suggesting a hypersensitive response characteristic of the LAR ("Local Acquired Resistance") occurring in plant defense responses.

EXAMPLE 5

Curative Treatment Against a Pathogen of Tobacco Leaves Using Extracts From Deciduous Leaves of Arborescent Woody Plants Identical compositions are used, as well as leaves originating from the same tobacco plants as in Example 2. Two discs (10 cm in diameter) are cut from a single leaf and then placed in a Petri dish containing a layer of 2% agarose gel.

The pathogen selected for the study is *Phytophthora parasitica* var. *nicotianae* (Ppn) isolate 329. The Ppn is grown on Malt Agar at 24° C. For the production of zoospores, the Ppn mycelium is grown for a week in V8 liquid medium at 24° C. under continuous light conditions, macerated, and then incubated for four days in water containing 2% agar. The zoospores are released by means of thermal shock consisting of two incubations, a first at 4° C. for 20 min, a second at 37° C. for 30 min after addition of 10 ml water. A zoospore suspension in water (1 zoospore per microliter) is prepared before being inoculated.

The compositions containing the extracts (50 µl) are infiltrated and the zoospore suspensions (100 µl) are inoculated into two separate regions, 1 cm apart, of the tobacco leaf parenchyma. Assays in which the compositions are replaced with salicylic acid (positive control) or ultrapure water (negative control) are performed. Three days after the infiltrations, the surface area of the region of infection is measured. The measurements are made using the Optima and Photoshop software for Windows.

Results

The results are summarized in Table 3. When testing the compositions containing extracts 7 and 8, the surface area of the region of infection is smaller than that of the test with ultrapure water, and is of the same order of magnitude as the test with salicylic acid. These results demonstrate the ability of the extracts to reduce the area of infection of pathogen Ppn in tobacco leaves. The level of protection measured for extracts 7 and 8 is respectively 46% and 44% compared to ultrapure water.

These data demonstrate that extracts from deciduous leaves of arborescent woody plants can be used for preventive or curative treatment of a plant against a pathogen.

TABLE 3

| | Ultrapure water | Salicylic acid | Extract 7 | Extract 8 |
|---|---|---|---|---|
| Surface area of region of infection (cm²) | 18.7 ± 2.6 | 10.9 ± 2.8 | 10.1 ± 4 | 10.4 ± 1.1 |

EXAMPLE 6

Photoprotection of a Pesticide

The photoprotection tests are performed with extracts 1 and 3 of Example 1. Two compositions are obtained by dissolving the two extracts in ultrapure water. The polyphenol concentration of the two compositions is 1 g/l. Each composition is stored at 4° C. until use.

The pesticide used is sulcotrione. It was used in its Mikado commercial formulation. Sulcotrione degrades when irradiated by sunlight. The speed of the photodegradation depends on the environment of the molecule. To be representative of actual usage conditions of the pesticide, the rate of sulcotrione photodegradation is measured with the latter being dry, deposited in crystallizing dishes where the bottom is covered by a film of paraffin wax simulating the thin layer of epicuticular wax covering the surface of plants.

Composition Absorption Test

Figure 7:
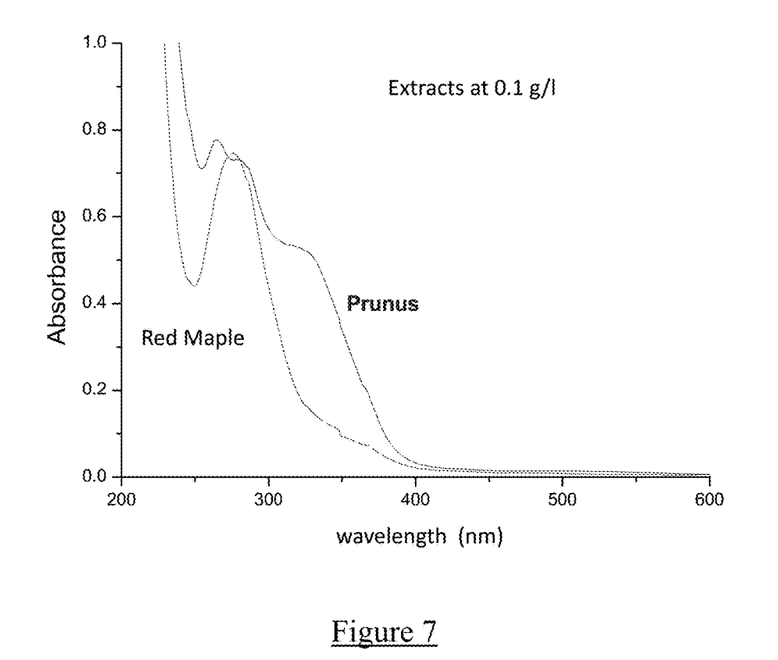
FIG. 7 shows an absorption spectrum of two extracts at a concentration of 1 g/l relative to the dry weight of the extract, between 220 nm and 600 nm.

The UV-visible spectra are recorded on a Cary 3 in a 1 cm path length quartz cell. The reference is MilliQ purified water. As shown in FIG. 7, the two compositions absorb between 290 nm and 400 nm, a useful wavelength region for photoprotection because it corresponds to the area where most phytosanitary products absorb, including sulcotrione.

This result illustrates that the photoprotective properties are independent of the origin and nature of the arborescent woody plants.

Sulcotrione Photoprotection Test

The formulated sulcotrione is deposited alone or in the presence of the compositions, 1 ml per crystallizing dish. The concentration of sulcotrione is fixed at 8 mg/l (100 g/ha) and that of the extracts is adjusted so that the absorbance of the compositions at 300 nm is equal to 4 for a 1 mm path length. The pH of the two compositions is normalized to 4.5 by the addition of sodium hydroxide. The crystallizing dishes are then inserted into a Suntest irradiator delivering a radiation similar in photon distribution and intensity to sunlight when the sun is at zenith in temperate regions, then removed after 3 h and 6 h of irradiation. The crystallizing dishes are rinsed with 2 ml ultrapure water and these solutions are analyzed by HPLC to determine their sulcotrione content.

Results

The variations in sulcotrione levels are shown in Table 4. One can see that the disappearance of sulcotrione is slowed down considerably by the extracts. Indeed, 65% of the sulcotrione that is alone disappears after 3 hours of irradiation and about 75% after 6 hours of irradiation. The loss is only about 10% after 6 hours of irradiation when extracts are present. The inhibiting effect can be calculated using the ratio of these rates. It is about 12 for all extracts. These results show that the extracts can be used for the photoprotection of pesticides.

TABLE 4

Variation in sulcotrione levels under irradiation

| Irradiated mixture | Initial sulcotrione content (U.A.) | Sulcotrione content after 3 h irradiation | Sulcotrione content after 6 h irradiation |
|---|---|---|---|
| Sulcotrione alone | 390 000 | 135 000 | 91 000 |
| Sulcotrione and extract 1 | 421 000 | | 380 000 |
| Sulcotrione and extract 3 | 430 000 | | 403 000 |

The invention claimed is:

1. A method for using deciduous leaves of arborescent woody plants, comprising the steps of:
    a) collecting deciduous leaves of at least one arborescent woody plant, wherein the arborescent woody plant is selected from the group consisting of acacia, birch, hornbeam, chestnut, oak, maple, ash, beech, *platanus, prunus*, willow, *sophora*, poplar, and a mixture thereof,
    b) subjecting the leaves to extraction at a temperature of from about 18° C. to about 25° C. with a hydroalcoholic solvent comprising water and at least 25% of ethanol (v/v) to produce an extract comprising from about 5% to about 40% by weight of polyphenols, and
    c) using said extract for a phytosanitary application wherein the phytosanitary application is selected from the group consisting of elicitation of a plant, said elicitation of a plant comprising stimulating the natural defenses of a plant, said stimulating the natural defenses of a plant being demonstrated by the expression of plant genes that are markers of SAR (Systemic Acquired Resistance) response, preventive treatment of a plant against a pathogen, and curative treatment of a plant against a pathogen.

2. A method according to claim 1, wherein the hydroalcoholic solvent used in step b) further comprises less than 5% (v/v) of an acid.

3. A method according to claim 2, wherein the acid is selected from the group consisting of hydrochloric acid, nitric acid, sulfuric acid, acetic acid and a mixture thereof.

4. A method according to claim 3, wherein the hydroalcoholic solvent comprises 80% ethanol (v/v) and 0.5% 0.1N hydrochloric acid (v/v).

5. A method according to claim 1, wherein application of the extract increases expression of plant genes that are markers of SAR (Systemic Acquired Resistance) response.

6. A method for using the deciduous leaves of arborescent woody plants, comprising the steps of:
    a) collecting deciduous leaves of at least one arborescent woody plant, wherein the arborescent woody plant is selected from the group consisting of acacia, birch, hornbeam, chestnut, oak, maple, ash, beech, chestnut, *platanus, prunus*, willow, *sophora*, poplar, and a mixture thereof,
    b) subjecting the leaves to extraction at a temperature of from about 18° C. to about 25° C. with an aqueous solvent consisting of bisulfite in water, where the bisulfite content is between 0.5 g/l and 2 g/l to produce an extract comprising from about 5% to about 40% by weight of polyphenols, and
    c) using said extract for a phytosanitary application wherein the phytosanitary application is selected from the group consisting of elicitation of a plant, said elicitation of a plant comprising stimulating the natural defenses of a plant, said stimulating of the natural defenses of a plant being demonstrated by the expression of plant genes that are markers of SAR (Systemic Acquired Resistance) response, preventive treatment of a plant against a pathogen, and curative treatment of a plant against a pathogen.

7. A method according to claim 6, wherein the aqueous solvent used in step b) consists of bisulfite in water, wherein the bisulfite content is between 0.75 g/l and 1.5 g/l.

8. A method according to claim 6, wherein application of the extract increases expression of plant genes that are markers of SAR (Systemic Acquired Resistance) response.

* * * * *